(12) United States Patent
Moody

(10) Patent No.: US 8,156,185 B1
(45) Date of Patent: Apr. 10, 2012

(54) METHOD AND SYSTEM FOR MONITORING THE STATUS OF AN ONLINE TRANSACTION

(75) Inventor: Paul Moody, Londonderry, NH (US)

(73) Assignee: IBM Corporation, Armonk, NY (US)

( * ) Notice: Subject to any disclaimer, the term of this patent is extended or adjusted under 35 U.S.C. 154(b) by 1714 days.

(21) Appl. No.: 10/147,164

(22) Filed: May 16, 2002

Related U.S. Application Data

(60) Provisional application No. 60/291,568, filed on May 17, 2001.

(51) Int. Cl.
*G06F 15/16* (2006.01)
*G06F 19/00* (2006.01)

(52) U.S. Cl. .................. 709/206; 700/115; 235/385

(58) Field of Classification Search .......... 709/203, 709/206, 224; 700/115; 235/385; 705/26.1
See application file for complete search history.

(56) References Cited

U.S. PATENT DOCUMENTS

| | | | |
|---|---|---|---|
| 5,555,346 A | 9/1996 | Gross et al. | |
| 5,765,028 A | 6/1998 | Gladden | |
| 5,781,857 A | 7/1998 | Hwang et al. | |
| 5,796,394 A | 8/1998 | Wicks et al. | |
| 5,802,253 A | 9/1998 | Gross et al. | |
| 5,809,492 A | 9/1998 | Murray et al. | |
| 5,893,083 A | 4/1999 | Eshghi et al. | |
| 6,035,104 A * | 3/2000 | Zahariev | 709/203 |
| 6,057,841 A | 5/2000 | Thurlow et al. | |
| 6,792,085 B1 * | 9/2004 | Rigaldies et al. | 379/88.13 |
| 2001/0007991 A1 * | 7/2001 | Tobin | 709/203 |
| 2002/0095355 A1 * | 7/2002 | Walker et al. | 705/26 |
| 2002/0111907 A1 * | 8/2002 | Ling | 705/41 |
| 2002/0123911 A1 * | 9/2002 | Bjerre et al. | 705/5 |
| 2002/0178023 A1 * | 11/2002 | Bjerre et al. | 705/1 |
| 2003/0097306 A1 * | 5/2003 | Boucher et al. | 705/26 |
| 2003/0105710 A1 * | 6/2003 | Barbara et al. | 705/39 |
| 2007/0029382 A1 * | 2/2007 | Baker et al. | 235/385 |
| 2007/0244977 A1 * | 10/2007 | Atkins | 709/206 |
| 2009/0292682 A1 * | 11/2009 | Robbins | 707/3 |
| 2010/0262478 A1 * | 10/2010 | Bamborough et al. | 705/14.16 |

FOREIGN PATENT DOCUMENTS

JP 08274809 10/1996

* cited by examiner

*Primary Examiner* — Ajay Bhatia
(74) *Attorney, Agent, or Firm* — Ostrow Kaufman LLP

(57) ABSTRACT

The invention includes methods and software for presenting a user with a set of interfaces that reveal what events are to occur, or are likely to occur, in a transaction, and provide the ability to program the automatic monitoring of these anticipated events with a customizable set of alerts. A merchant encodes events that are possible for the transaction as part of developing an online transaction system such as an online catalog. The data regarding these events is encoded in an electronic communication, such as an email or onsite transaction history item, such that this data can be detected by a receiving system. The method includes presenting and setting monitoring options for event notices that have not yet been received. The chosen options for event notices that have not yet been received are used to program the monitoring and alerting of the user when such event notices have or have not been received.

13 Claims, 5 Drawing Sheets

Configure Thread-Ahead...

As part of the transaction, you can preent the customer with a set of events that they can monitor automatically.
Not all of these events have to, or will occur for each transaction, but represent the total of all possible events that your customer may wish to monitor After the initial notice, reveal the possibility of future notices for:

☐ Successful payment
  clearance of credit card transaction, receipt of money orders, checks or purchase orders ☐ Shipment of all merchandise in this order
  ☐ include shipping tracking information ☐ Shipment of only part of the merchandise in this order
  ☐ include shipping tracking information ☐ Shipment of remaining merchandise in this order
  ☐ include shipping tracking information
    this option will be used if partial shipping occurs ☐ Delay in shipping
    this option will be used no partial shipping occurs ☐ Survey of customer satisfaction relating to this order
    follow-up survey selected for random orders ☐ Announcement of future sales events (all merchandise)
  ☐ Limited to the merchandise related to this order ☐ Distribution of discount coupons (all merchandise)
  ☐ Limited to the merchandise related to this order ( OK )      ( CANCEL )

| From | Subject | Time | Date |
|---|---|---|---|
| Dan Gruen | Intern Hiring? | 1:57pm | 01/31/2000 |
| Paul Moody | I'm Tying my shoes too - Re: admin meeting | 2:01pm | 01/31/2000 |
| Brian Baker | re: Lotus Research and telling "stories" | 2:04pm | 01/31/2000 |
| Irene Greif | Re: admin meeting | 2:23pm | 01/31/2000 |
| Steve Rohall | Lotus Research logo... | 2:37pm | 01/31/2000 |
| The Standard | The Industry Standards Intelligencer -v1.95 | 2:41pm | 01/31/2000 |
| orders | Your Order with Amazon.com (#8675309-1313) | 2:44pm | 01/31/2000 |
| The Standard | The Industry Standard's Daily News - 1/31/2000 | 3:02pm | 01/31/2000 |
| Paul Walnut | Interns: An issue I would have brought up at .... | 3:03pm | 01/31/2000 |

Customer Satisfaction Survey (aticipated future email)

orders@amazon.com                                amazon.com
(anticipated email)

Your Order with Amazon.com (#8675309-1313)

When your order ships, we will send you an email with tracking information.

What would you like happen...

⦿ Treat it like regular mail (do nothing special)
○ Notify me when it arrives via: [Skytel pager (617-901-55555, ,1234567) ▶]
  ○ Notify me it will not arrive before: [12:01pm ▶] [Wednesday, June 14, 2000 ▶]
○ Forward it to: [Fed Ex Tracker (sends updates daily) ▶]
○ Delete it

METHOD AND SYSTEM FOR MONITORING THE STATUS OF AN ONLINE TRANSACTION

RELATED APPLICATION

This application claims priority to U.S. Provisional Application No. 60/291,568, filed on May 17, 2001, entitled, "METHOD AND SYSTEM FOR MONITORING THE STATUS OF AN ONLINE TRANSACTION," which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to networked computer systems. More particularly, the present invention relates to transactions performed over a computer network and techniques for monitoring the status of such transactions.

When a networked computer is used to complete a transaction, the transaction generally produces a series of events of interest to the user who caused the transaction. Many users would like to monitor these events. An example is the use of an online catalog system, where a user selects merchandise for purchase and delivery. Once the transaction is completed online, there is a set of events that will occur which the user would like to monitor. These include:
  the successful payment clearance;
  acknowledgement of the order listing the details of the merchandise and the shipping information;
  any merchandise that is not available for shipment as requested in the transaction;
  any merchandise that has been shipped, including tracking information if available;
  any surveys that track customer satisfaction relating to the order, its handling and the merchandise;
  any announcements of sales events or new products relating to the merchandise in the order; and
  any complimentary discounts (coupons) for future transactions.

Current online transactions systems do provide some if not all of these notices, however, they are distributed in a way that leaves them unconnected in the user's monitoring systems, such as the user's email or onsite 'my account' transaction history page. It is difficult to manage these various unconnected notices.

Furthermore, some of the events are time sensitive. For example, delays in shipping merchandise because of its current unavailability is time sensitive in that a user aware of this event may make an alternative selection or make the purchase through other means. However, knowing that an order is being delayed is difficult to detect given the unconnected nature of the notices. Finally, most of these notices are part of a pattern of transaction etiquette that is developing for online transactions, and will vary from merchant site to merchant site, making it difficult for a new customer to know what to expect.

There is thus a need for techniques and supporting software for monitoring the status of transaction performed in an on-line medium.

BRIEF SUMMARY OF THE INVENTION

It is an object of the present invention to solve the problems discussed above relating to on-line transactions.

It is another object of the present invention to allow users to better monitor the status of a transaction performed in an on-line environment such as over the world wide web.

It is another object of the present invention to provide a program for allowing such monitoring to be performed using a user's existing email system.

The above and other objects are achieved by a method and software for presenting a user with a set of interfaces that reveal what events are to occur, or are likely to occur, in a transaction, and provide the ability to program the automatic monitoring of these anticipated events with a customizable set of alerts. The method includes a merchant encoding events that are possible for the transaction as part of developing an online transaction system such as an online catalog. The method further involves encoding the data regarding these events in an electronic communication, such as an email or onsite transaction history item, such that this data can be detected by a receiving system.

In some embodiments, the method includes presenting and interacting with the entirety of the possible events that can be monitored by the user. The method further includes presenting and setting monitoring options for event notices that have not yet been received. The chosen options for event notices that have not yet been received are used to program the monitoring and alerting of the user when such event notices have or have not been received.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is an exemplary event list used to select events to be monitored by the system of FIG. 2;

FIG. 5 is an exemplary screen display of the status of events which have yet to occur, as monitored by the system of FIG. 2;

DETAILED DESCRIPTION OF THE PREFERRED EMBODIMENTS

Figure 1:
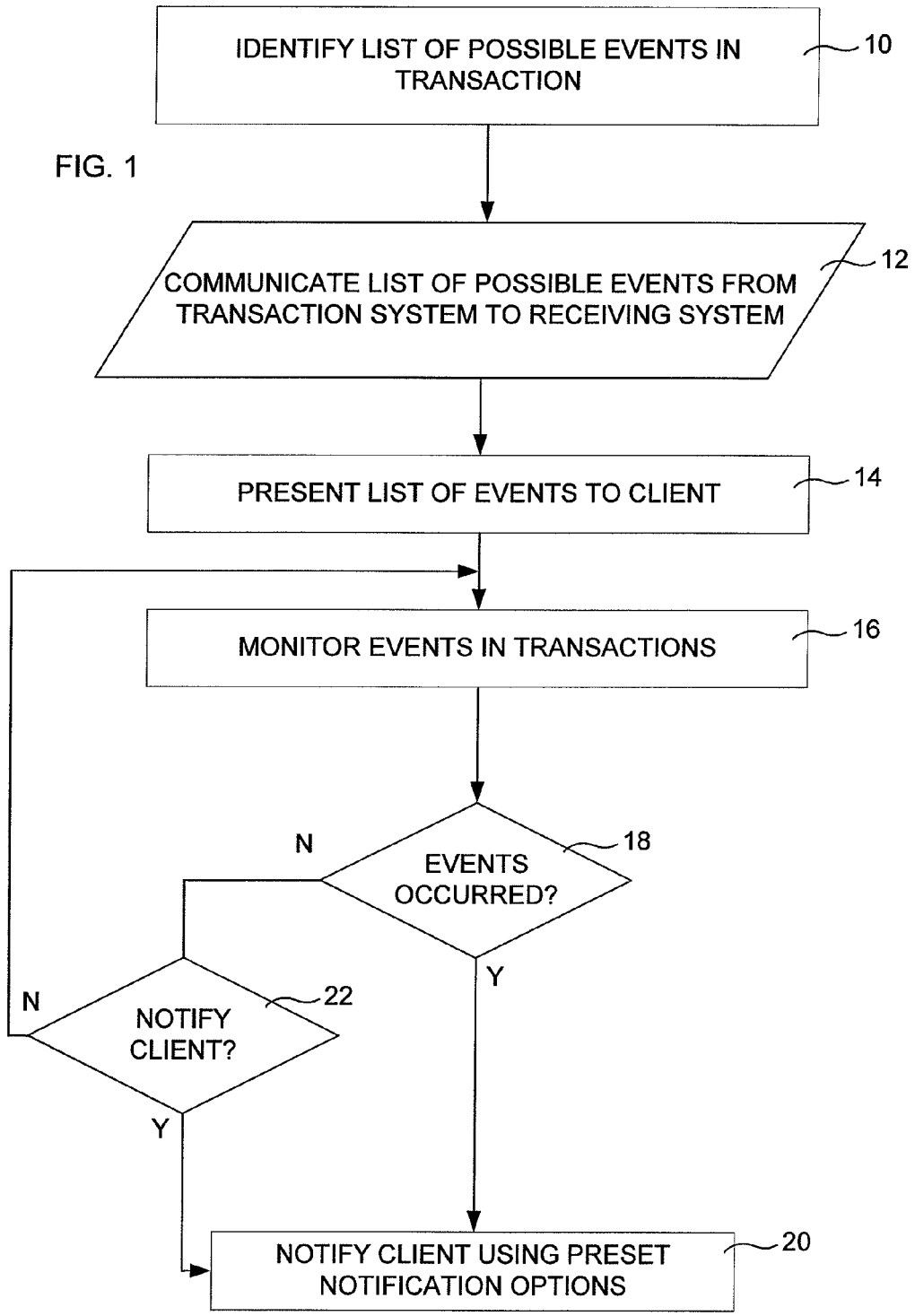
FIG. 1 is a flow chart showing a method of monitoring the status of a transaction in accordance with one embodiment of the present invention.

Preferred embodiments of the invention are now described with reference to the drawings. In accordance with the invention, and with reference to FIG. 1, a method of monitoring the status of a transaction involves identifying a list of possible events in a transaction which would be presented to users or clients who engage in the transaction, step 10. This may be performed by a merchant or other entity sponsoring or promoting the transaction. The list of possible events in the transaction is communicated to a receiving system, step 12. The list may first be encoded, as described further below, into a format suitable for transmission over a desired communication system or protocol such as email or HTTP. When a client initiates the transaction, such as by making a purchase from the merchant, the list of possible events in the transaction is presented to the client, step 14. Exemplary events for a commercial transaction may include credit card approval, shipment of all or part of an order, delay in shipping, satisfaction survey, coupon announcements, related advertisements, etc.

The receiving system monitors events as they occur in transactions, step 16. The receiving system may monitor events in messages received from the one or more transaction systems, or may actively poll the transaction system for status information on events. If an event is detected to have occurred relating to a transaction being monitored, step 18, the client is notified of the event through a message or posting, step 20, in accordance with notification settings selected by the client. For example, the client may prefer to be notified of certain events by email, pager, instant message, or any other means of communication. Similarly, the client may prefer to be notified if a certain event has failed to occur by a given time or condition. If a client has made such a setting and wished to be notified, step 22, the client is so notified in accordance with its selected settings, step 20.

Figure 2:
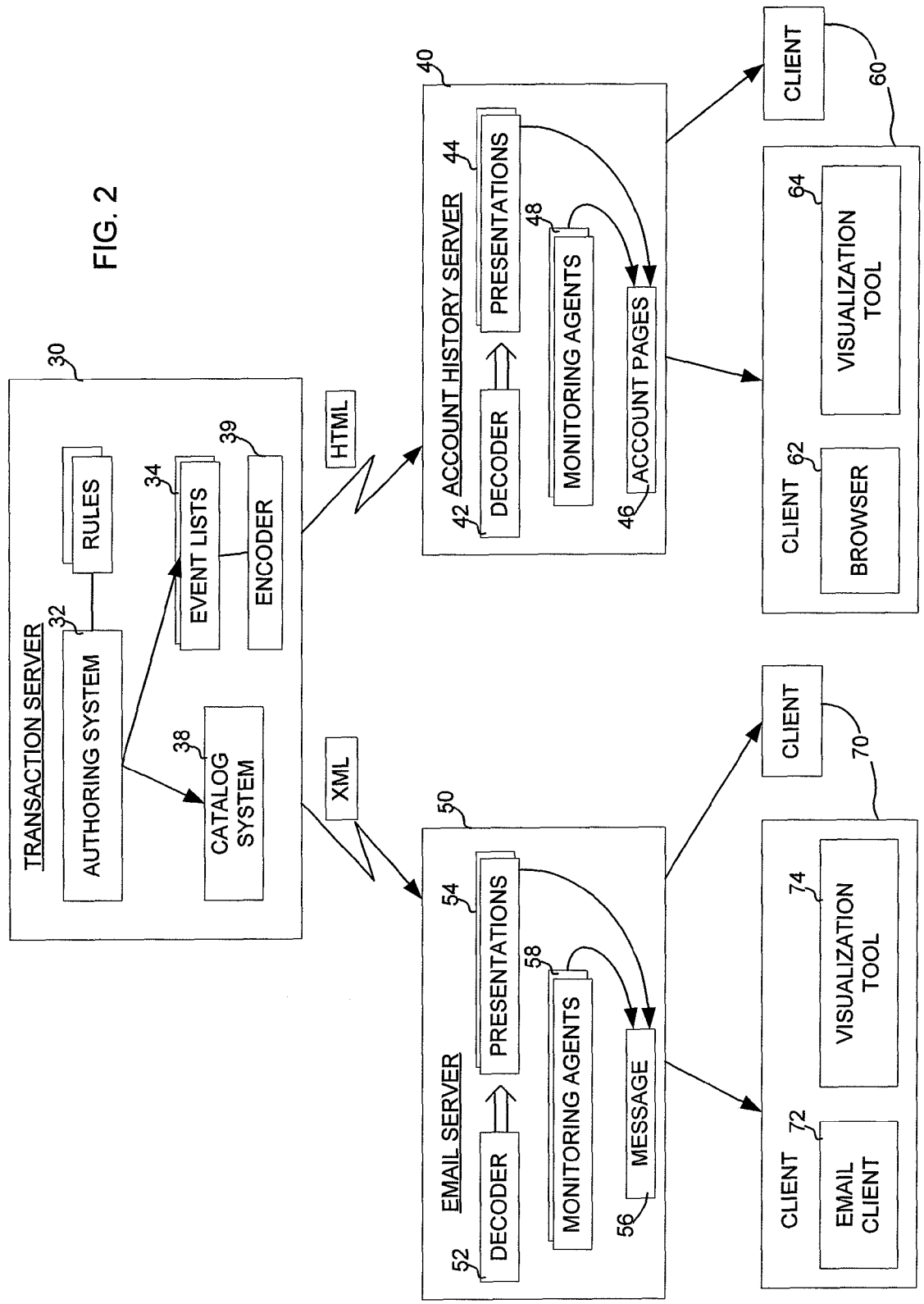
FIG. 2 is a block diagram showing a system for the status of a transaction in accordance with one embodiment of the present invention.

Embodiments of the system of the system of the present invention are shown in FIG. 2. As shown, the system includes a transaction server 30 which communicates with an account history server 40 and/or an email server 50. These servers may communicate over any known network, including wide area networks, local area networks, or the Internet. The transaction server 30 supports a method of encoding the events that are possible for the transaction that is done by the merchant as part of its online catalog and transaction system. The transaction server 30 includes an authoring system 32 that online merchants use to generate automatic notification of acknowledgement of a transaction. An example of such an authoring system is IBM's Catalog authoring system for the Websphere Net Commerce system. The authoring system 32 offers the merchant a list of events 34 to present to the user as part of the first notification. The list is customized for the merchant as part of the development of its online catalog transaction settings in its catalog system 38, as the events that they will present are determined by the business practices of that particular merchant as represented by a set of rules 36.

For example, the sending of discount coupons may be the practice of some merchants, but not of others, or may be offered to certain customers and not others. The online catalog transaction system can be programmed with rules 36 that determine if such an event is possible for this transaction based upon conditions set forth by the merchant. By choosing the events from the offered list 34, the merchant is programming the presenting of these events to the user as part of the initial transaction notice.

FIG. 3 shows a sample list offered to a merchant during the programming of the online catalog system. The list may be formatted as an HTML form or in any other known document format. The list may also allow merchant to specify the options available to clients for how to receive notifications, for example, by setting options based on notification methods that the merchant's system supports, or for given programs running on a given receiving server, exposing capabilities of the receiving server. Merchants may also set default notification values, e.g., we will notify by email unless client indicates otherwise.

After the merchant has programmed its online catalog system with the desired events in its event list 34, future transactions use these settings to include future event information in transaction acknowledgement sent as part of the normal online transactions. This is similar to workflow systems, where the system operators encode possible actions taken in the routing of a form. However, unlike workflow systems, the present system allows for the encoding of possible actions around end user notification of status and within email systems.

The transaction server 30 further contains an encoder 39 for encoding the event list data in an electronic communication such that this data can be detected by a receiving system such as account history server 40 or email server 50. The data that is used by the receiving system 40 or 50 to present the events the user can monitor is included in an initial notice. This initial notice is either sent via email to the email server 50 or via the posting of an item in the user's account history page 46 on the merchant's account history site 40.

In the case of sending this notice via email, the event information is encoded so that it can be used by email system features that comply with the desired specifications of the present system, or if these features are missing, as in a non-compliant email system, it can be ignored. In the event of posting to the merchant's online site, there should be no need to encode it such that it can be ignored. In this latter case, the information is encoded into HTML or other such markup languages used to present the contents of the items in the user's account history page 46.

One implementation of encoding the event monitoring data in an email is by the use of XML tagged data in a field labeled "Events" in the header of the email notice. Other methods are also possible, as the event data only needs to be encoded in such a way that it is contained in the header information of the email and not presented to the user unless decoded by the receiving email system. A complying receiving email system 50 contains algorithms in a decoder 52 that check the header information looking for the "Events" and, if found, uses an XML parser to decode the contents.

The XML for encoding the event information field may look like the following, although other formats are possible:

<EVENT MONITORING>
  <CURRENT EVENT>
    Initial Event List
    <ORDER NUMBER>
    002-1175626-2665042
    <END ORDER NUMBER>
  <END CURRENT EVENT>
  <EVENT LIST>
    <EVENT>
    Initial Event
    <END EVENT>
    <EVENT>
    Order Shipped
    <TRACKING>
      Federal Express
    <END TRACKING>
    <END EVENT>
//This pattern of event/end event repeats until all events are listed. Each event contains any special information needed to offer the user options for monitoring this event.//
  <END EVENT LIST>
<END EVENT MONITORING>.

Thus, a field of data may thereby be embedded in an email that is used to present a set of future emails that have not yet been received so that they can be shown in advance of their occurrence. The future emails reporting events as they occur also contain identifying information in XML in their headers relating to that particular event such as the order number identifying the transaction and the event's place in the transaction, e.g., event number or type.

The present system supports a method of presenting the entirety of the possible events that can be monitored by the user. The receiving email system 50 or online merchant account history page system 40 uses the encoded information in the notice to construct a presentation 54, 44 of the events anticipated for the transaction. The presentation 54 is sent via email message 56 to a client 70 having an email client. Presentation 44 is sent to client 60 requesting its account history page 46 via browser 62. Clients 60, 70 have a visualization tool 64, 74, which presents the data in the presentation in a graphical user interface on a client's display. The GUI shows the set of events being monitored and the status of the events in the set. The preferred method of visualization is a link and node visualization that is presented adjacent to the monitoring options for each future event, or the actual notification for events that have occurred. The visualization tool on the client may be written in a multimedia oriented language such as LINGO available from Macromedia for use with its Director software.

Figure 4:
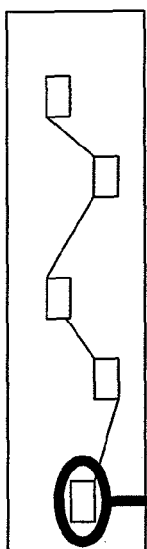
FIG. 4 is an exemplary screen display of the status of events which have occurred, as monitored by the system of FIG. 2.

FIG. 4 is an exemplary screen display showing the presentation of event notices that have occurred. In FIG. 4, a visualization B is incorporated into an email listing A (which could be an account history listing instead), and presented along with the actual notice of an event that has occurred C for the selected transaction event D and showing the other possible events E. Thus, the entire set of anticipated or possible emails is displayed in-situ with the email list in this example. In addition, the particular visualization technique of a link node shows both past event notices (e.g., previous email notices and whether the user has seen them or not), and possible future event notices not yet received, as a single thread.

FIG. 5 shows an exemplary screen display showing the visualization of monitoring options for event notices that have not yet been received. In FIG. 5, a visualization B is incorporated into an email listing A and presented along with the options for an event that has not occurred F and the specific options G used for programming the monitoring behavior for the anticipated notice for the selected anticipated event H as well as a mouse tracking display hover-over I that previews selected information for events visualized in the visualization. The specific options G may include: treating the anticipated notice as a regular email; notifying the client via a specific means such as pager or instant message; notifying the client if the notice does not arrive by a certain selected time; forwarding the notice to another application such as FedEx tracker client; deleting the message; or any other notification option. Thus, this form provides a mechanism for dealing with specific emails that have yet to arrive. Although some current email systems support filtering classes of emails from the same address or sorting and filing, they do not support dealing with a specific anticipated email. The use of a form in place of the anticipated email is a unique user interface presentation, and no other known system displays an alternate message based on the situation.

As shown in FIGS. 4 and 5, the linked node visualization shows the sequence of events in the transaction in graphical form as a set of nodes representing the events connected in a time line or similar graphical structure representing their sequence. Nodes representing events which have occurred and been notified may be changed in color, shape, or other characteristic to reflect that the client has already been notified. This represents a convenient and quick reference for clients to determine the position of each event within the overall transaction.

The client's selections regarding notification options are encoded into XML or other protocol and inserted into the header of, or fields in the body of, an email sent back to the merchant. The merchant stores the client's selected options and delivers the event notices accordingly.

The receiving systems 40, 50 contain components for monitoring and alerting clients of events which have or have not yet occurred based on their chosen options for event notices. These components include monitoring agents 48, 58 which monitor incoming events and associate them with the proper transactions.

As described above, the options presented for events that have not yet occurred are displayed as a programming form. When the user fills in the form and then closes the form, or selects another event for the current transaction via the visualization control, or selects another transaction or email from the email or account history list, the complying email client or account history server does the following procedure. First, it processes the form by inspecting each option for its settings, in a way similar to a program inspecting the settings in any of its dialog windows. Next, it converts the options selected into native programming APIs. This is done by matching options settings with pre-stored generator code, which when run uses the settings from the form to create an agent 48, 58 or continuously running program that looks for the conditions indicated by the options. If the conditions are met, the agent or program 48, 58 executes the native programming on behalf of the user. The steps of creating agents and executing the native programming are similar to those described in U.S. Pat. No. 5,802,253, which is hereby incorporated herein.

The system and method of the present invention may be used in similar fashion in other contexts in which an online transaction, commercial or otherwise, involves a series of steps or notices which a user would want to track or monitor. For example, a task to be performed by two or more people working at different client machines may involve their being notified at the occurrence of specific events. A server such as the transaction server may detect the occurrence of these events and report them to receiving servers using an appropriate communication protocol. The event lists and event data are encoded and decoded and then presented to clients using the visualization tool described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer-implemented method for monitoring the status of a transaction performed between a local computer user and a remote computer, the transaction comprising a series of events, the method comprising:

electronically receiving via email by a processing device from the remote computer, a list of events involved in the transaction, including one or more future events;

electronically storing, via the processing device, the list of events involved in the transaction;

automatically monitoring, via the processing device, email messages received from the remote computer to determine an occurrence of events involved in the transaction by associating data in each monitored email message with data in the stored list of events and to determine whether the monitored email message represents an event corresponding to a given event in the stored list of events;

notifying the local computer user, via an email message by the processing device, upon the occurrence of the given event involved in the transaction or the failure of a given event involved in the transaction to occur, the email message includes a graphical representation of the list events involved in the transaction and a list of anticipated future emails, not yet received, associated with the one or more future events;

providing to the local computer user a representation a given anticipated future email and a form for user selection of receiving one or more future emails corresponding to the anticipated future email, the representation of the given anticipated future email including a graphical object representing a linked node visualization of occurred events and the one or more future events; and encoding the user selection into a reply email to the processing device.

2. The method of claim 1, comprising allowing a user to select one or more future events from the received list of events whose status is to be monitored.

3. The method of claim 1, comprising storing the received list of events in a memory device accessible to the local computer user.

4. The method of claim 1, wherein receiving the list of events comprises receiving the list embedded in a header of an email message from the remote computer.

5. The method of claim 1, wherein receiving the list of events comprises receiving a list of event identifiers each identifying an event involved in the transaction.

6. The method of claim 5, wherein monitoring email messages comprises receiving messages each including an event identifier embedded therein and comparing each embedded event identifier to the event identifiers in the list of event identifiers to thereby associate the message with an event in the list.

7. The method of claim 1, comprising allowing the local computer user to select one or more notification options by which to be notified and wherein notifying the local computer user of the occurrence of an event or failure of an event to occur comprises notifying the local computer in accordance with the selected one or more notification options.

8. The method of claim 7, wherein allowing the local computer user to select one or more notification options comprises allowing the user to select from the group consisting of: email message, instant message, and page.

9. The method of claim 1, wherein notifying the local computer user upon the failure of a given future event involved in the transaction to occur comprises notifying the local computer user when the event has not occurred within a certain selected amount of time.

10. The method of claim 1, wherein displaying the representation of the events involved in the transaction comprises displaying a graphical object representing a linked node visualization of the events and their sequence within the transaction.

11. The method of claim 1, wherein displaying the representation of the events involved in the transaction comprises visually distinguishing between events which have occurred and events which have yet to occur at any given time at which the representation is being displayed.

12. A non-transitory computer readable medium storing program code which, when executed on a computer, cause the computer to perform a method for monitoring at an intermediate server the status of a transaction performed between a local computer user and a remote computer, the transaction comprising a series of events, the method comprising:

receiving in an email message from the remote computer a list of first events involved in the transaction, including one or more future events;

storing the list of events involved in the transaction in a memory accessible to the intermediate server;

automatically monitoring email messages received from the remote computer, at least some of which contain event identifiers representing events involved in the transaction, to determine an occurrence of events involved in the transaction by associating event identifiers in each monitored email message with the stored list of events and to determine whether the monitored email message represents an event corresponding to a given event in the stored list of events;

notifying the local computer user, via an email message, upon the occurrence of the given event involved in the transaction as determined by the presence of a matching event identifier in a received email message or the failure of the given future event involved in the transaction to occur as determined by the failure to receive an email message containing a matching event identifier within a certain amount of time, the email message including a graphical representation of the events involved in the transaction and a list of anticipated future email messages, not yet received, each representing an anticipated future event involved in the transaction following;

providing to the local computer user a representation of a given anticipated future email message and a form for user selection of receiving one or more future notifications corresponding to the anticipated future email message, the representation of the given anticipated future email message including a graphical object representing a linked node visualization of occurred events and a plurality of future events; and encoding the user selection into a reply email to the remote computer.

13. The computer readable medium of claim 12, wherein the list of events and the event identifiers are embedded in the header of email messages.

* * * * *